(12) United States Patent
De Wit et al.

(10) Patent No.: US 11,480,943 B2
(45) Date of Patent: Oct. 25, 2022

(54) METHOD AND ASSEMBLY FOR FORMING A BUILDING ELEMENT

(71) Applicant: AECTUAL HOLDING B.V., Amsterdam (NL)

(72) Inventors: Martine De Wit, Amsterdam (NL); Hedwig Heinsman, Amsterdam (NL); Hans Vermeulen, Amsterdam (NL)

(73) Assignee: AECTUAL HOLDING B.V., Amsterdam (NL)

( * ) Notice: Subject to any disclaimer, the term of this patent is extended or adjusted under 35 U.S.C. 154(b) by 516 days.

(21) Appl. No.: 16/407,142

(22) Filed: May 8, 2019

(65) Prior Publication Data
US 2019/0302737 A1    Oct. 3, 2019

Related U.S. Application Data

(63) Continuation of application No. PCT/NL2017/050723, filed on Nov. 8, 2017.
(Continued)

(30) Foreign Application Priority Data

Nov. 8, 2016 (NL) ..................................... 2017746

(51) Int. Cl.
    *G05B 19/4099*     (2006.01)
    *B33Y 10/00*        (2015.01)
(Continued)

(52) U.S. Cl.
CPC ............ *G05B 19/4099* (2013.01); *B28B 7/00* (2013.01); *B29C 64/00* (2017.08); *B33Y 10/00* (2014.12);
(Continued)

(58) Field of Classification Search
CPC ...... G05B 19/4099; G05B 2219/49007; G05B 2219/35134; G06F 30/13; G06F 2113/22;
(Continued)

(56) References Cited

U.S. PATENT DOCUMENTS

2013/0124148 A1*   5/2013   Jin ........................... G06T 7/55
                                                                 703/1
2015/0172628 A1*   6/2015   Brown ................... G06T 17/05
                                                                  348/47
(Continued)

FOREIGN PATENT DOCUMENTS

WO        2016157284 A1    10/2016

OTHER PUBLICATIONS

"Excerpt", Allplan/Allplot FTV16. Neues in Version 16. Intelligente Losungen Fur Das Bauw of Jun. 1, 2006, p. 111.
(Continued)

*Primary Examiner* — Michael J Brown
(74) *Attorney, Agent, or Firm* — AEON Law, PLLC; Adam L. K. Philipp; David V. H. Cohen

(57) ABSTRACT

A method of designing and engineering a building element (e.g., a staircase) that is structurally verified and may be easily certified. The method uses a parametric three-dimensional (3D) model of the building element and a constraint space definition. It ensures that the building element will fit in the building and will comply with functional, legal, and/or other requirements, such as strength, dimensional requirements, or use of certain materials. A computer system provides a user tool for easily amending the building element while visualizing it in its specific use. It also converts the amended building element to processing instructions for 3D manufacturing, such that the end product complies with the constraint space definition. A user without extensive knowledge of engineering, complex computer-aided design
(Continued)

(CAD) programs, or 3D manufacturing can easily amend a design to his or her personal need and have the building element custom produced.

14 Claims, 6 Drawing Sheets

Related U.S. Application Data

(60) Provisional application No. 62/419,172, filed on Nov. 8, 2016.

(51) Int. Cl.
| | |
|---|---|
| *B33Y 50/02* | (2015.01) |
| *B29C 64/00* | (2017.01) |
| *B28B 7/00* | (2006.01) |
| *G06F 30/13* | (2020.01) |
| *G06F 111/04* | (2020.01) |
| *G06F 113/22* | (2020.01) |
| *G06F 119/18* | (2020.01) |

(52) U.S. Cl.
CPC .............. *B33Y 50/02* (2014.12); *G06F 30/13* (2020.01); *G05B 2219/35134* (2013.01); *G05B 2219/49007* (2013.01); *G06F 2111/04* (2020.01); *G06F 2113/22* (2020.01); *G06F 2119/18* (2020.01)

(58) Field of Classification Search
CPC ....... G06F 2119/18; B29C 64/00; B28B 7/00; B33Y 10/00; B33Y 50/02; B33Y 50/00
USPC ......................................................... 700/98
See application file for complete search history.

(56) References Cited

U.S. PATENT DOCUMENTS

| | | |
|---|---|---|
| 2016/0001461 A1 | 1/2016 | Gardiner et al. |
| 2016/0070255 A1 | 3/2016 | Loberg |
| 2016/0086258 A1* | 3/2016 | Romes .................. B29C 64/393 |
| | | 705/27.1 |

OTHER PUBLICATIONS

Medjdoub B et al: "Separating topology and geometry in space planning", Computer Aided Des, Elsevier Publishers BV., Barking, GB, part 32, No. 1, Jan. 1, 2000 (Jan. 1, 2000), pp. 39-61.

* cited by examiner

METHOD AND ASSEMBLY FOR FORMING A BUILDING ELEMENT

FIELD OF THE INVENTION

The invention relates to a method, a computer program product and an assembly for forming a building element.

BACKGROUND OF THE INVENTION

Computer aided design (CAD) in general has taken huge steps with the introduction of 3D design software.

US2016086258, for instance, describes according to its abstract methods, systems, and apparatus, including medium-encoded computer program products, facilitate creation and use of customizable three dimensional models. In one aspect, a method includes receiving input specifying one or more controls that modify geometry of a three dimensional (3D) model of an object; converting the 3D model of the object and the one or more specified controls into a program that runs in a publicly available runtime environment to provide a model interface to change the 3D model in accordance with the one or more specified controls when the program is run in the publicly available runtime environment; and publishing the program to an online marketplace for 3D models available for 3D printing. The publications seems to be directed to small consumer articles.

US2016070255 according to its abstract describes: "Methods and systems allow for creating a variable spatial framework for use in designing and manufacturing an architectural component. The spatial framework can define a three-dimensional space having a plurality of boundaries. The system can receive an input to divide the three-dimensional space into multiple independent cells. Each independent cell can comprise an independently executable software object. A plurality of boundaries of the spatial framework can automatically adjust upon receiving an input defining a manufacturing constraint."

MEDJDOUB B ET AL: "Separating topology and geometry in space planning", COMPUTER AIDED DES, ELSEVIER PUBLISHERS BV., BARKING, GB, part 32, nr. 1, 1 Jan. 2000 (2000-01-01), pp. 39-61, in its abstract states: "We are dealing with the problem of space layout planning here. We present an architectural conceptual CAD approach. Starting with design specifications in terms of constraints over spaces, a specific enumeration heuristics leads to a complete set of consistent conceptual design solutions named topological solutions. These topological solutions which do not presume any precise definitive dimension correspond to the sketching step that an architect carries out from the Design specifications on a preliminary design phase in architecture."

"EXCERPT", ALLPLAN/ALLPLOT FTV16. NEUES IN VERSION 16. INTELLIGENTE LOSUNGEN FUR DAS BAUW of 1 Jun. 2006, page 111 (internet document), seems to relate to engineering aspects of a staircase.

WO2016157284 according to its abstract describes that "Provided is a system for designing, order reception, and making a production order for a product created from a plurality of part members, wherein the system comprises: a means for reading the plurality of part members, calculating part member spaces, and inputting the same; a unit space creation input means for displaying a unit space in which part member spaces are surface associated with each other, and for enabling changes to be input with respect to the unit space; a unit and part member surface associating means for surface associating the six surfaces of the unit space with each surface of the plurality of part members which constitute units; a product creation means for combining units to create a product; a unit space change input means for inputting data for changing the dimensions of the unit space; an information processing means for receiving the inputted unit space changes and changing the dimensions of the part member spaces which constitute the unit space; a storage means; an output display means for outputting and displaying 3D images of the product and the like; and a production order means."

US2016001461 according to its abstract describes: "The present invention relates to a method for casting building material to form a construction element using a computer-controlled apparatus. The method comprises the steps of: moving the material deposition head and selectively depositing material, to fabricate a formwork; pouring building material in contact with at least a portion of the formwork; at least partially curing the building material, thereby forming the construction element; and removing at least a portion of the formwork from the construction element."

SUMMARY OF THE INVENTION

It is an aspect of the invention to provide an alternative method for making a building element. Alternatively or additionally, it is an aspect of the invention to provide an alternative design method, software and assembly for making a building element.

To that end, there is provided a method for forming a building element, comprising defining in a computer memory:
  a building element parametric three-dimensional (3D) model of a building element, and
  a building element constraint space, said building element constraint space comprising building element dimensional parameters of said building element that are mathematically coupled to at least one selected from another dimensional parameter of the building element, a minimum value, a maximum value, and a combination thereof;
providing at least one 3D manufacturing assembly comprising a control system having a data processor for processing control instructions for controlling said 3D manufacturing assembly,
said method further comprising running a computer program on a computer system which:
  retrieves from said computer memory said building element parametric 3D model and its linked constraint space;
  visualizes said building element parametric 3D model through a display system;
  provides a user tool which is visualized through said display system and which allows a user to modify one or more building element dimensional parameters to provide an amended building element parametric 3D model by receiving user input via a user input system that is operationally coupled with said computer system, wherein said modification of said building element dimensional parameters by said user tool is limited by said building element constraint space;
  visualizes said amended building element parametric 3D model through said display system in response to said user input, and
  converts said amended building element parametric 3D model into control instructions for a control system for controlling at least one 3D manufacturing assembly for forming said amended building element and provides said control instructions to said control system.

In a further aspect, the invention pertains to a computer program product for forming a building element, said computer program product when running on a data processor system:
- retrieves from said computer memory said building element parametric 3D model of said building element and its linked constraint space; and
- visualizes said building element through a display system;
- provides said user with a user tool which is visualized through said display system and which allows said user to modify one or more building element dimensional parameters to provide an amended building element parametric 3D model by receiving user input via a user input system that is operationally coupled with said computer system, wherein said modification of said building element dimensional parameters by said user tool is limited by said building element constraint space;
- visualizes said amended building element parametric 3D model through said display system by showing said user an amended building element via said display system in response to said user input, and
- converts said amended building element parametric 3D model into control instructions for controlling a 3D manufacturing process for forming said amended building element.

In yet a further aspect, the invention pertains to an assembly for forming a building element, comprising:
- a 3D manufacturing assembly;
- a computer system comprising a display system, a computer memory storing a building element parametric 3D model of said building element and a data processing system comprising a computer program which, when running on said data processing system:
  - retrieves from said computer memory said parametric 3D model of said building element and its linked constraint space, and;
  - visualizes said building element through a display system;
  - provides said user with a user tool which is visualized through said display system and which allows said user to modify one or more building element dimensional parameters to provide an amended building element parametric 3D model by receiving user input via a user input system that is operationally coupled with said computer system, wherein said modification of said building element dimensional parameters by said user tool is limited by said building element constraint space;
  - visualizes said amended building element parametric 3D model through said display system by showing said user an amended building element via said display system in response to said user input, and
  - converts said amended building element parametric 3D model into control instructions for controlling a 3D manufacturing process for forming said amended building element.

It was found that using the method or software, it is possible to provide an end product that is structurally verified, and may be easily certified Due to the nature of the constraint space, all possible outcomes are verified, and may be easily certified. Many or most of these requirements relate to technical features of a building product, like strength, dimensional requirements, use of certain materials, and the like.

The three-dimensional (3D) manufacturing process may comprise known production processes that result in a three dimensional object. Such a process may in general comprise production processes like a moulding process, a machining process, a welding process, a printing process, like 3D printing, and the like. In the current application, the building element is formed, in which forming refers to moulding and the like, to producing using machining, to additive manufacturing steps, or a combination thereof.

When a printing process is used, this can relate to a process or use of a 3D printing assembly in which a material is printed that directly forms an object, here the building element. Alternatively, a 3D printing assembly can print for instance a mould that can be used in the production of the building element. In such an application, a setting material or mouldable material can be inserted into the 3D printed mould. Making for instance building elements of a setting material or a mouldable material can be done using or applying a printing process in many ways, even in combination. When using a process like printing in the manufacturing of building elements, use can thus be made of 3D (three dimensional) printing in various steps of the production, but also other printing processes that are sometimes referred to as 2D printing or even 2.5D printing can be used.

In the current application, a parametric 3D model is a mathematical model of a 3D object, for instance the building element. There are different approaches for 3D modelling an object, for instance solid modelling, surfacing, geometric modelling, and the like. In 3D modelling, the mathematical model defines the object. In an embodiment thereof, using mathematical functions that have parameters, a 3D object can be defined. The definition of the various parameters in these functions geometrically define the object and thus define the dimensions of the object. These functions may also define other properties of the object, like density. These properties can be defined locally.

In an embodiment, the method further comprises:
- defining in said computer memory at least one building part parametric 3D model relating to a building part where said building element is to be used, and
- defining in said computer memory for said building part parametric 3D model a building part constraint space comprising at least one building part dimensional parameter of said building part that is mathematically coupled to at least one building element dimensional parameter, and that is mathematically coupled to at least one selected from another building part dimensional parameter, to a minimum value, to a maximum value, and a combination thereof, and
- wherein said computer program further
- provides said user tool for receiving user input via said user input system that is operationally coupled with said computer system, to allow said user to modify one or more dimensional parameters of said building part parametric 3D model into an amended building part parametric 3D model, wherein said computer program compares modification of said one or more building part dimensional parameter by said user with limitations by said building part constraint space and said building element constraint space;
- modify said building element dimensional parameters in reaction to said modified building part dimensional parameters to provide an amended building element parametric 3D model, which modification of said building element dimensional parameters is limited by said building element constraint space and said building part constraint space;

visualizing said amended building part parametric 3D model together with said building element parametric 3D model through said display system thus showing said user an amended building element in combination with said amended building part via said display system in response to said user input.

In this way, a flexible, easy to maintain system, assembly, method and software can be provided. In this way, the building environment where the building element is to be used or applied or inserted can be customized to make sure that the building element will fit in the building or (building) structure and yet complies with functional, legal and any other requirements. In addition, also aesthetical customization can be done. In this way, the building element is always verified, and may be easily certified.

Usually, a building part is coupled to one or more building elements. For instance, when a building element is a staircase, a building part may be a room, a hallway, but even a façade or another structural (civil engineering) construction into which or onto which such a staircase may be added.

In an embodiment, the method further comprises a constraint database comprising at least one database entry selected from a numerical value, a mathematical relation, and a combination thereof, wherein at least one parameter of said building part constraint space and at least one parameter of said building element constraint space are mathematically coupled to said database entry.

In the constraint database, for some dimensional or other building requirements, officially regulated values may be centrally maintained. Such requirements may be general building requirements that can apply to many types of building elements and many types of building parts or even structures.

In an embodiment, the method further comprises:
defining in a computer memory a series of said building element parametric 3D models of a series of building elements;
defining in a computer memory for each of said building element parametric 3D models one of said building element constraint space;
said computer program further:
presents a selection tool on said display system to allow a user to select a building element from said series of building elements, and retrieve user input via said user input system indicating a selected building element;
retrieves from said computer memory said building element parametric 3D model of said selected building element and its linked constraint space, and
visualizes through said display system said building element parametric 3D model of said selected building element.

The method allows for instance one or more designers to easily add their designs of building elements to the method, or to a system or an assembly. A user who may be a builder or even a consumer may thus easily select a design, and modify elements like for instance dimensions to the specific needs of his or her building, for instance.

In an embodiment, the method further comprises:
defining in a computer memory a series of said building part parametric 3D models of a series of building parts;
defining in a computer memory for each of said building part parametric 3D models one of said building part constraint space;
said computer program further:
presents a selection tool on said display system to allow a user to select a building part from said series of building parts, and retrieve user input via said user input system indicating a selected building part;
retrieves from said computer memory said building part parametric 3D model of said selected building part and its linked constraint space, and
visualizes through said display system said building element parametric 3D model of said selected building element with said building part parametric 3D model of said selected building part.

This further adds to for instance the flexibility of the method, system or assembly. Designs of building elements may be added. The design may then be combined with or linked to various building parts that are already present. Thus, a user may select a building element and in a next step may select a building part that matches his or her specific situation or needs. The user thus customizes the building element within the constraint space.

In an embodiment, the building element constraint data comprises dimensional parameter requirements selected from legal requirements on said building element, design requirements on said building element, structural requirements of said building element, production requirements, installation requirements, and a combination thereof.

The building element constraint space, but also (independently) the building part constraint space, comprise parameter information that may originate from these requirements. Thus, it is possible during the customization of a building element, to assure that at any stage of customization, the design complies with all regulations and requirements. Thus, any adjustment that the user makes using the user tools, will result in a verified building element, that may be easily certified.

In an embodiment, for gathering said building element constraint data, said computer program runs at least one query on at least one remote computer system.

In an embodiment, the computer program further comprises indicating a nature of said constraint, in particular on said display system, when said user tool is limited by at least one selected from said building element constraint space, said building part constraint space, and a combination thereof, a nature of said limitation, in particular indicating while showing said amended building element via said display system.

Via for instance feedback a user receives suggestions on the nature of the limitation of the modification. Thus, the user is limited in his or her design customization in order get to a design that is already verified and that can easily be certified and approved, leading to an end product (building element) that is easily certified and approved.

In an embodiment, the 3D manufacturing assembly comprises a 3D printing assembly.

In an embodiment, the 3D printing process may comprise printing the building element using a setting composition or for instance a metal or polymer composition. Thus, a building element or a building element pre-form may be produced that may require more or less post processing, for instance sanding, tooling/machining, or the like.

In another embodiment, the 3D printing process may comprise 3D printing a mould that can be filled with a setting composition, for instance plaster, polymer composition, concrete of another ceramic composition. The mould may be produced from a recyclable material, or for instance from a bio-plastic or other biodegradable material or composition.

In an embodiment, the forming comprises applying a setting composition, in particular moulding said setting composition.

In an embodiment, the method comprises said computer program performing:

transforming said building element constraint into said building element constraint space, in particular transforming said building element constraint data into said constraint space comprises transforming constraint data requirements into spatial dimensional boundaries and spatial dimensional boundary mathematical dependencies relating to said building element.

In an embodiment, the user tools comprise visualizing on said display system design suggestions for amending dimensional parameters of said building element for fitting said building element parametric 3D model within said building element constraint space and said building part constraint space.

The method features may be added to the software and/or assembly in their proper context.

The application may run on a computer system, comprising one or more servers that may be remote from one another and be connected to one another via data connections. Servers also includes hardware or firmware devices including one or more processors, one or more additional devices, a computer readable medium, a communication interface, and one or more user interface devices. Each processor is capable of processing instructions for execution within the server. In some implementations, the processor is a single or multi-threaded processor. Each processor is capable of processing instructions stored on the computer readable medium or on a storage device such as one of the additional devices or from a computer memory that is accessible to the server. The server uses its communication interface to communicate with one or more computers, for example, over a network. Examples of user interface devices include a display, a camera, a speaker, a microphone, a tactile feedback device, a keyboard, a mouse, a gesture interpretation device, biosensors, and the like. The server can store instructions that implement operations associated with the modules and/or software described in this description, for example, on the computer readable medium or one or more additional devices, for example, one or more of a hard disk device, an optical disk device, a solid state memory device, and other computer memory devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, computer memory, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from at least one of read-only memory, random access memory, computer data storage, and other computer memory. Elements of a computer are a processor for performing instructions and one or more memory devices for storing instructions and data. Generally, a computer may also include, or be operatively coupled to receive data from or transfer data to, or both, one or more mass storage devices for storing data. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) or other type of flat panel display, holographic projection devices, image projection devices like beamers, virtual reality devices, and the like, for displaying information to the user and a keyboard and a pointing device, e.g., a mouse or a trackball, gesture transfer device for instance using one or more camera's, or ever direct brain input, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. Cloud computing implementation may also be used. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). These networks can be wired or wireless.

The computing system can include clients and servers. A client and server are generally remote from each other and typically interact through a communication network. The relationship of client and server arises by virtue of computer programs running on the respective computers and having a client-server relationship to each other.

The term "substantially", such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DESCRIPTION OF PREFERRED EMBODIMENTS

In the current description, as an example of a building element a staircase or stairway will be shown and discussed to illustration the design and production of a building element. Many other building elements are possible, however. The building element will in this example be designed to fit into a building part. Currently, a room is presented as an example of a building part. Furthermore, in this example use is made of a display screen that is well-known to a skilled person. Alternatives, as mentioned before, are possible, for instance using virtual reality, 3D projections, and the like. In any of these alternatives, a building element can be presented in a building part, and with user tools for modifying the design and parameters of the building element in order to provide a customizable building element.

In the current application a user will first select, from many possible building elements, a building element the user wants to be produced. It may be possible to present a series of different designs or types of similar building elements. For instance, various types of staircases may be presented. Next the user selects a design he wants to have produced. As a subsequent step, the user may be presented with a building part into which the building element has to be used, or alternatively the user may select such a building part, or, alternatively, the user may design a building part and place the building element into it. It may be clear that combinations, sequential orders and alternatives of these steps may be used.

Figure 1:
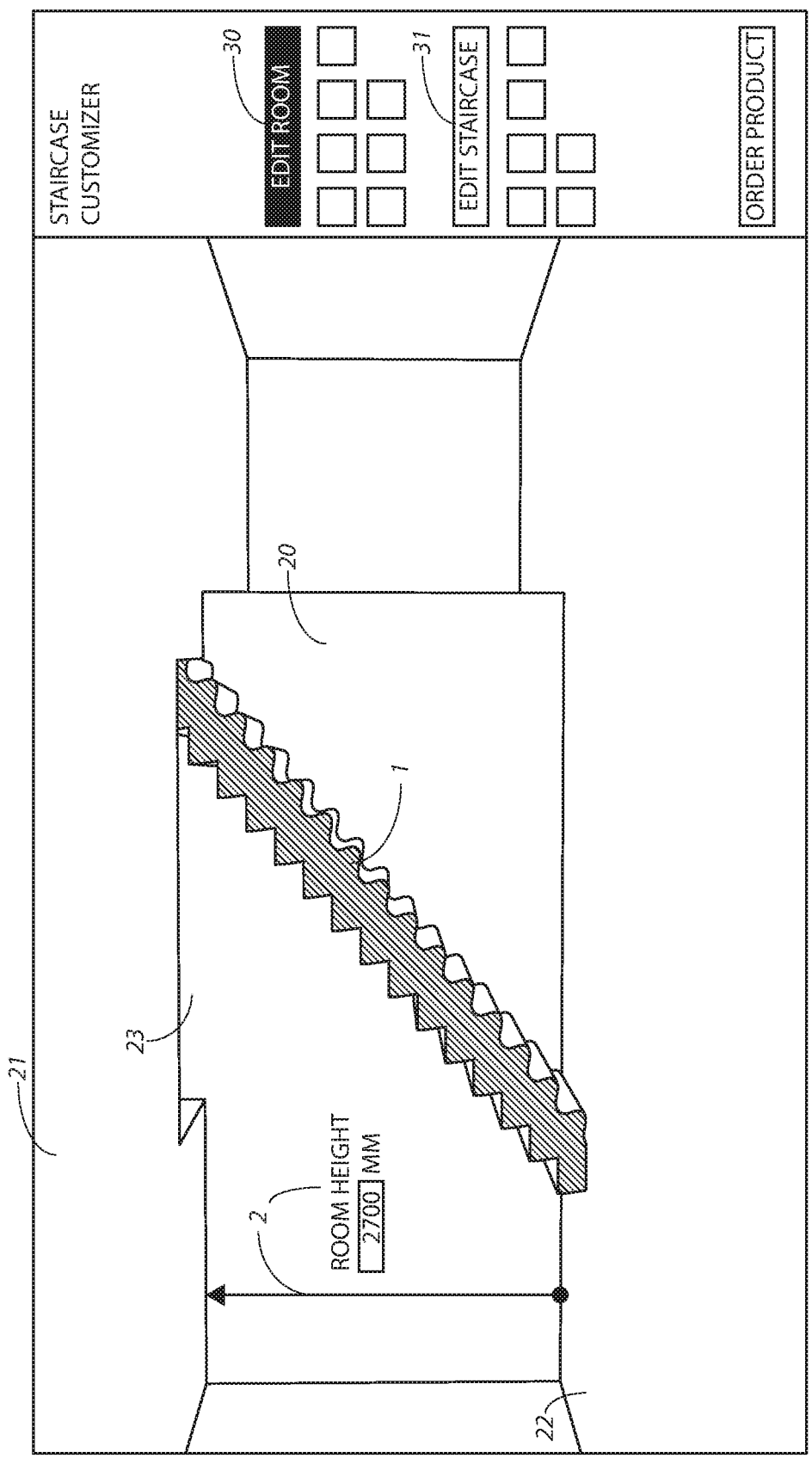
FIG. 1 schematically depicts a schematic screenshot of a customization screen for the building part, here a room.

A next step is the customization of the selected design of the building element 1, in this example the staircase 1. A schematic representation of a screenshot of a customization screen is depicted in FIG. 1. In the customization screen of FIG. 1, a building element 1, here the staircase 1, is visualized. The building element 1 is here visualized in its use in a room 20 as an example of a building part 20. Here, the staircase 1 is shown in a room 20 with a ceiling 21, a floor 22 and an opening 23 in the floor 22 where the staircase 1 has to be fitted. As explained earlier, in a possible previous selection screen the user may have indicated where and how in the building part 20 the building element 1 should be used or placed.

In the customization screen, the user may here activate a building part customization selector 30 (here indicated "EDIT ROOM") or a building element customization selector 31 (here indicated "EDIT STAIRCASE"). It allows the user, via user tools 2 that will be explained later, to customize the design and dimensions of the building element 1.

When the user selects the building part customization selector 30, the user will be presented with user tools 2 for customization of the dimensions of the building part 20. A computer system as explained earlier is provided with a building part parametric 3D model and a building element parametric 3D model that are used in combination to visually represent the building element 1 in its use in the building part 20. The customization software further uses the building part constraint space and the building element constraint space, that each have dimensional parameters that are mutually coupled, and have one or more dimensional parameters that are mathematically coupled resulting in a coupling of these constraint spaces.

Thus, when customizing the room 20 (i.e., the building part), this may result in amendments in the dimensions of the staircase 1 (i.e., the building element 1). And, in fact, if the user (tries to) amend(s) dimensional parameters of the room 20, coupling of dimensional parameters in the constraint spaces may also result in changes in the dimensional parameters of the staircase 1, which will be visualized. If the user tries to amend dimensional parameters beyond the constraint spaces, the user will receive feedback, as will be explained below.

As mentioned, in FIG. 1 the user activated the building part customization selector 30, and is now able to customize the room 20. In the current embodiment, the user is presented with selectors for selecting an aspect of the room that can be amended, end when a selection is made, the user is presented with a user tool 2, here for customizing "ROOM HEIGHT". In the current embodiment, the user tool 2 provides the user with two possibilities for amending. First is by selecting the arrow and dragging the arrow up and down for making the room 20 higher or lower. The numerical field will show the actual height. Alternatively, the user can fill out the numerical field.

Figure 2:
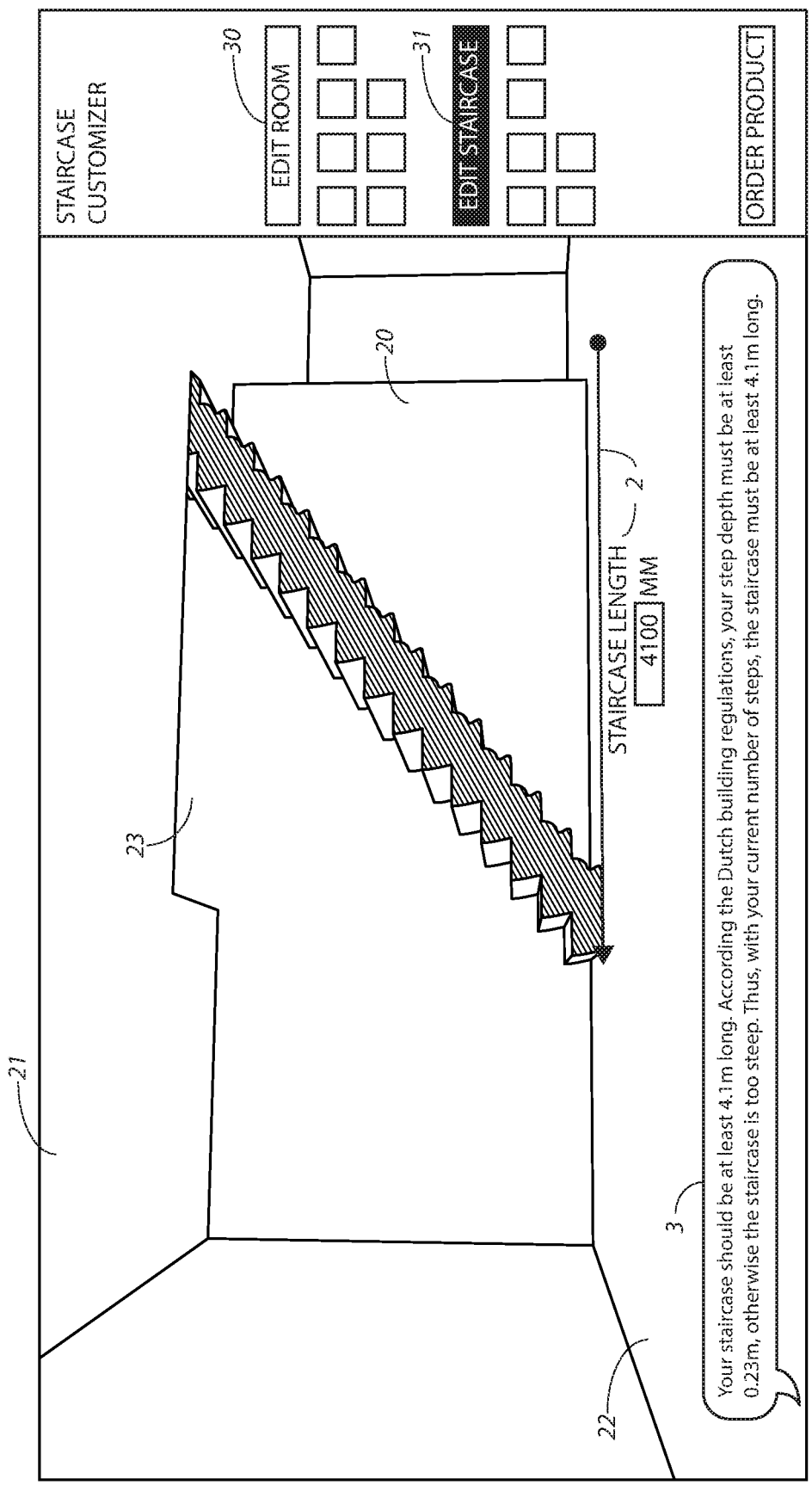
FIG. 2 schematically depicts a further schematic screenshot of a customization screen for the building element, here a staircase.

In FIG. 2, the user activated the building element customization selector 31. Now, the user can customize the design and dimensional parameters of the staircase 1. In the customization of the design, various design elements of the building element 1 can be selected. For instance, buttons or other selection devices or attributes can be presented that allow for instance selection of the rear ornamentation of the staircase 1. In this customizer screen, the user already changed the design of the rear side of the staircase. Note that with respect to FIG. 1, the rear of the staircase 1 changed. These presented design elements are all pre-tested and pre-evaluated. Furthermore, dimensional parameters of the building element 1 can be customized. As an example of a user tool 2, an input box 2 is presented where the user can input the length of the staircase ("STAIRCASE LENGTH"). Other dimensions of the building element can be customized in a similar manner. For instance, the width of the staircase 1, the step inset, the length of the staircase, and/or the number of steps can be customized. Again, a user tool 2 is presented again with an arrow that can be selected and the length of which can be adjusted. The user tool 2 here also has a numerical field, showing the actual value and allowing input of a new numerical value.

When customizing a parameter, the program recalculated other parameters to fit these other parameters, but will also check requirements. This is possible as all the parameters are limited by minimum/maximum values and/or links to other dimensional parameters in each of the constraint spaces. Thus, if a parameter like the length of the staircase is changed, those parameters that are liked in the constraint space will directly change also, but within their limits in the constraint space. And again, this may also affect parameters of the building part 20 (room). And these parameters may also run against limits through (one of the) constraint spaces.

In FIG. 2, it is also presented what happens if a user tries to customize a parameter in such a way that the building element 1 is not within the constraint space any more. If the user input in the user tool 2 would result in an design that cannot be produced, or that is not within building regulations, the building element 1 would be outside the constraint space and this will be indicated in a user feedback tool 3. The user feedback tool 3 can also be indicated which specific other parameter is outside the constraint space. Furthermore, it is possible to provide feedback to the user as to the reason why the parameter that is outside its boundaries is bounded.

Here it is stated "Your staircase should be at least 4.1 m long. According the Dutch building regulations, your step depth must be at least 0.23 m, otherwise the staircase is too steep. Thus, with your current number of steps, the staircase must b at least 4.1 m long".

Figure 3:
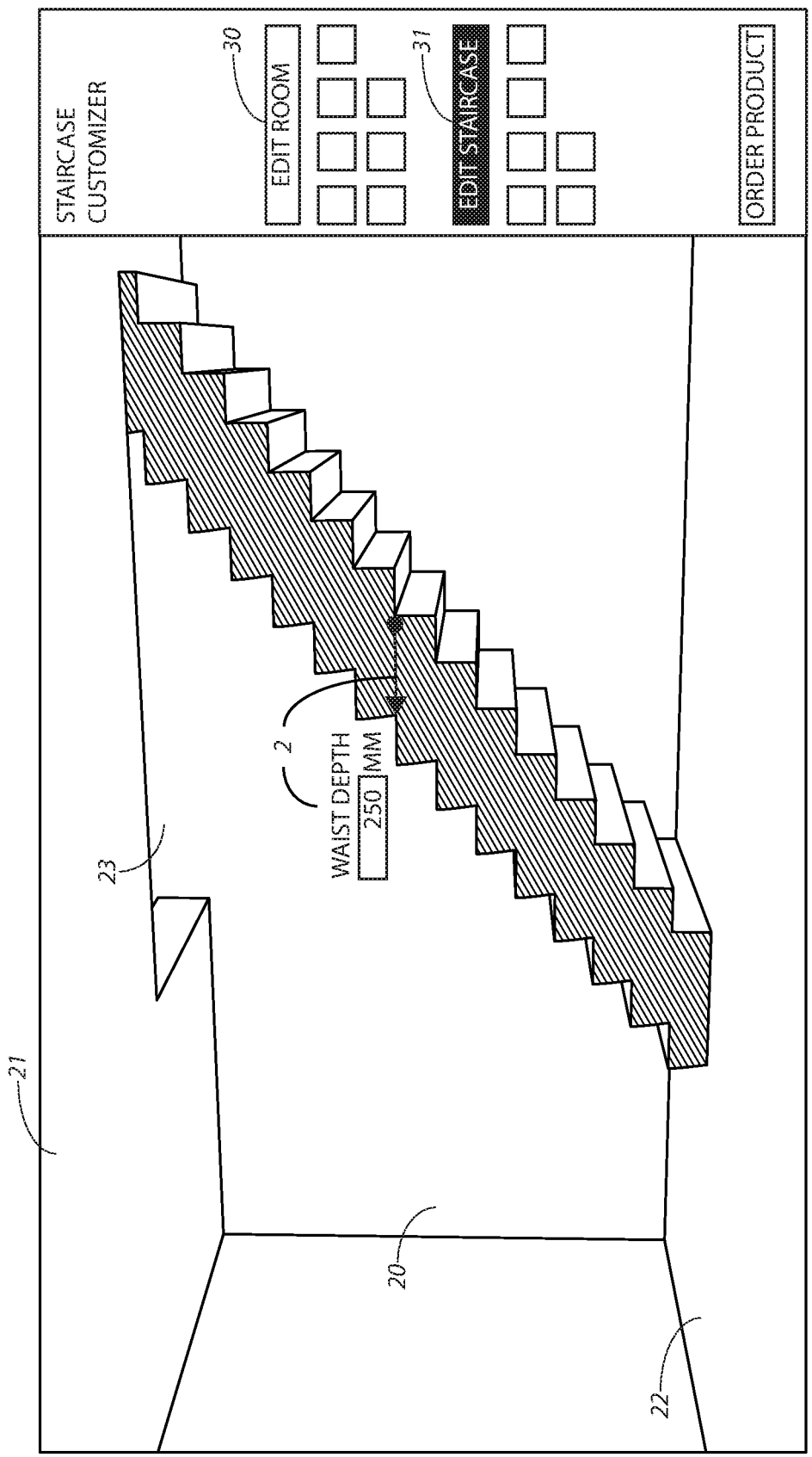
FIG. 3 schematically depicts a further schematic screenshot of a customization screen for the building element, here a staircase.

In FIG. 3, the user selected another design parameter to customize. Here, the user tool 2 presents "WAIST DEPTH" as dimensional parameter to be customized. Again, the user may simply insert the desired value of this parameter in the indicated value field. Alternatively, the user may select the indicated arrow and drag for instance one of the ends in order to change the parameter. In such an event, the actual value can also be indicated in value field. The change may be limited by constraints. These constraints can be defined in as constraints of the building element itself. Furthermore, constraints defined in relation to the building part can be considered. Please note that here the user again changed the design of the rear side of the staircase 1.

Figure 4:
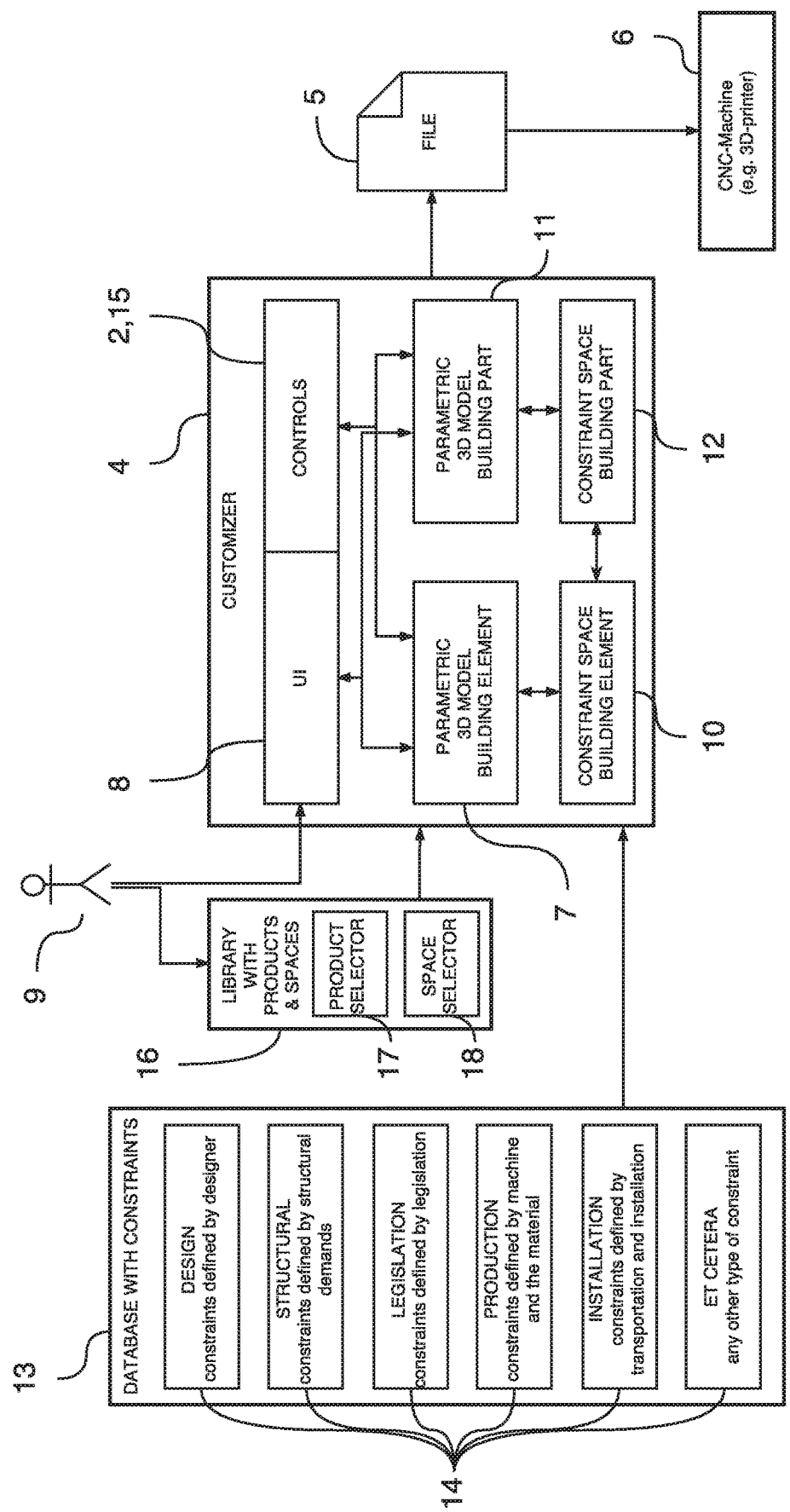
FIG. 4 elements for providing a system for forming a building element.

In FIG. 4, an embodiment is schematically depicted for an implementation of an assembly for forming a building element. In this embodiment, a database with constraints 13 is provided. The constraint database 13 is functionally coupled to a customizer 4. In an embodiment, the customizer 4 outputs a production instruction 5 for a production assembly 6.

In the constraint database 13, all the constraints in a design of a specific building element 1 are entered that have an impact on dimensional parameters and thus on the producibility of the building element 1. These database entries usually are numerical values, but may also be mathematical relations between parameters that are more general in nature. In the current embodiment, in the constraint database 13 the constraints are classified into constraint classes 14 that effectively determine if a design can be realized, and if there are other requirements. In addition, constraints can be added that relate to aesthetical qualities of the building element. In this example database 13, as an example various constraint classes 14 are presented:

DESIGN: specific constraints that are defined by a designer;

STRUCTURAL: constraints that are defined by structural requirements;

LEGISLATION: constraints that are defined by or follow from legislation;

PRODUCTION: constraints that follow from production machines and material that is selected;

INSTALLATION: constraints defined by for instance transportation, and installation;

ET CETERA: possible further types of constraints.

The customizer 4 in the current embodiment has several components. It holds a building element parametric 3D model 7 of the building element 1. In this embodiment, the customizer 4 further comprises a user interface 8 that allows a use to provide user input in the user tools 2, and that provides feedback to the user via the user feedback tool 3. It further provides a visual representation.

The customizer 4 furthermore holds a building element constraint space 10. In the building element constraint space 10, the various dimensional parameters of the building element 1 are mutually connected using the information from the constraint database 13, thus defining the building element constraint space 10. The building element constraint space 10 is functionally coupled to the building element parametric 3D model 7.

The customizer 4 outputs the production instruction 5 for a production system 6. The production instruction 5 in an embodiment can be an instruction file for one or more production machines of a production system 6. For instance, the production instruction 6 may comprise a file that provides machine instructions for operating a 3D printer. Alternatively or additionally, the production instruction 6 may comprise in instruction file for operating for instance another CNC device, like a welding robot, a milling machine, a cutting tool, or the like.

Figure 5:
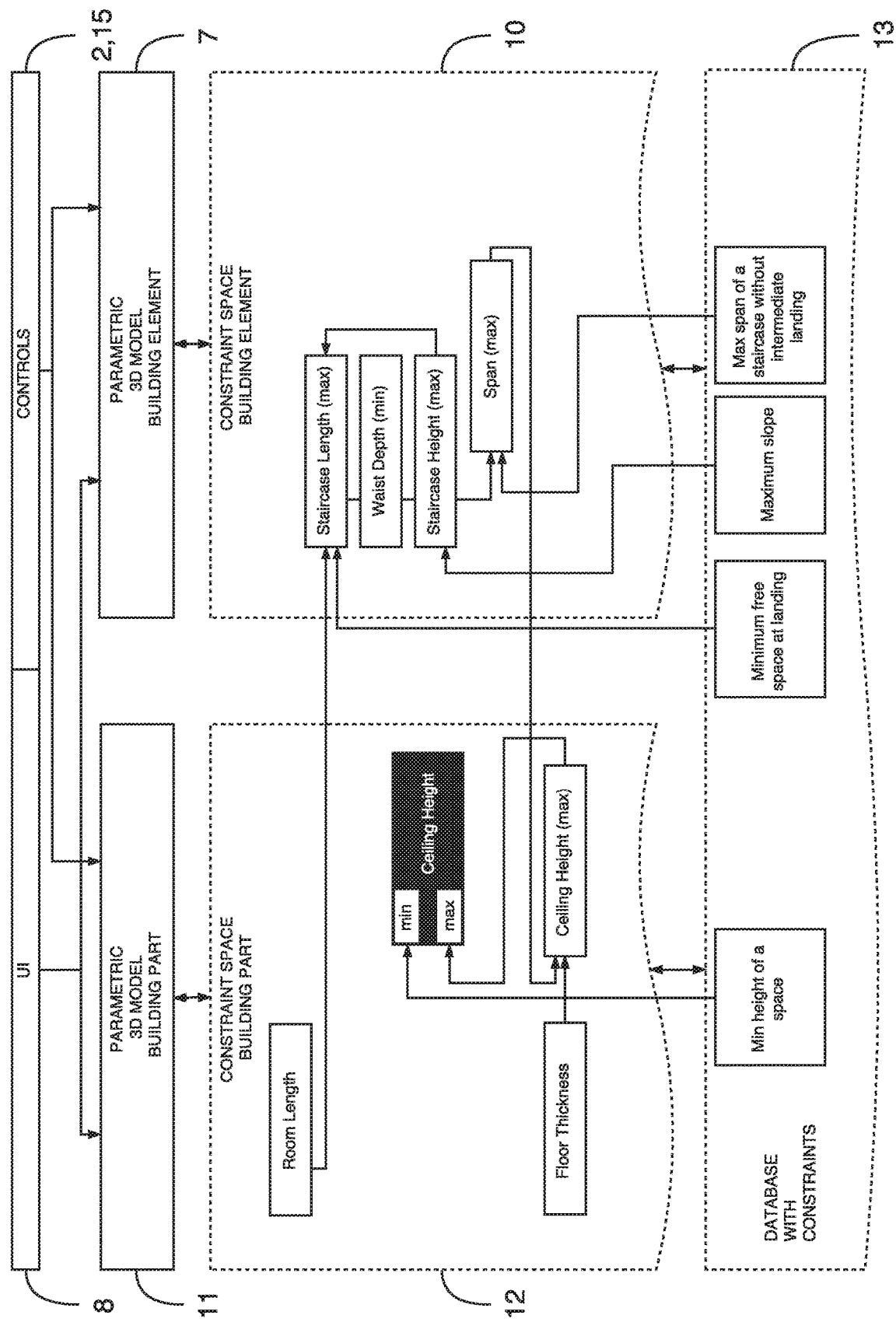
FIGS. 5 and 6 a schedule showing part of a constraint space definitions, showing dependencies of the building part constraint space and the building element constraint space.
Figure 6:
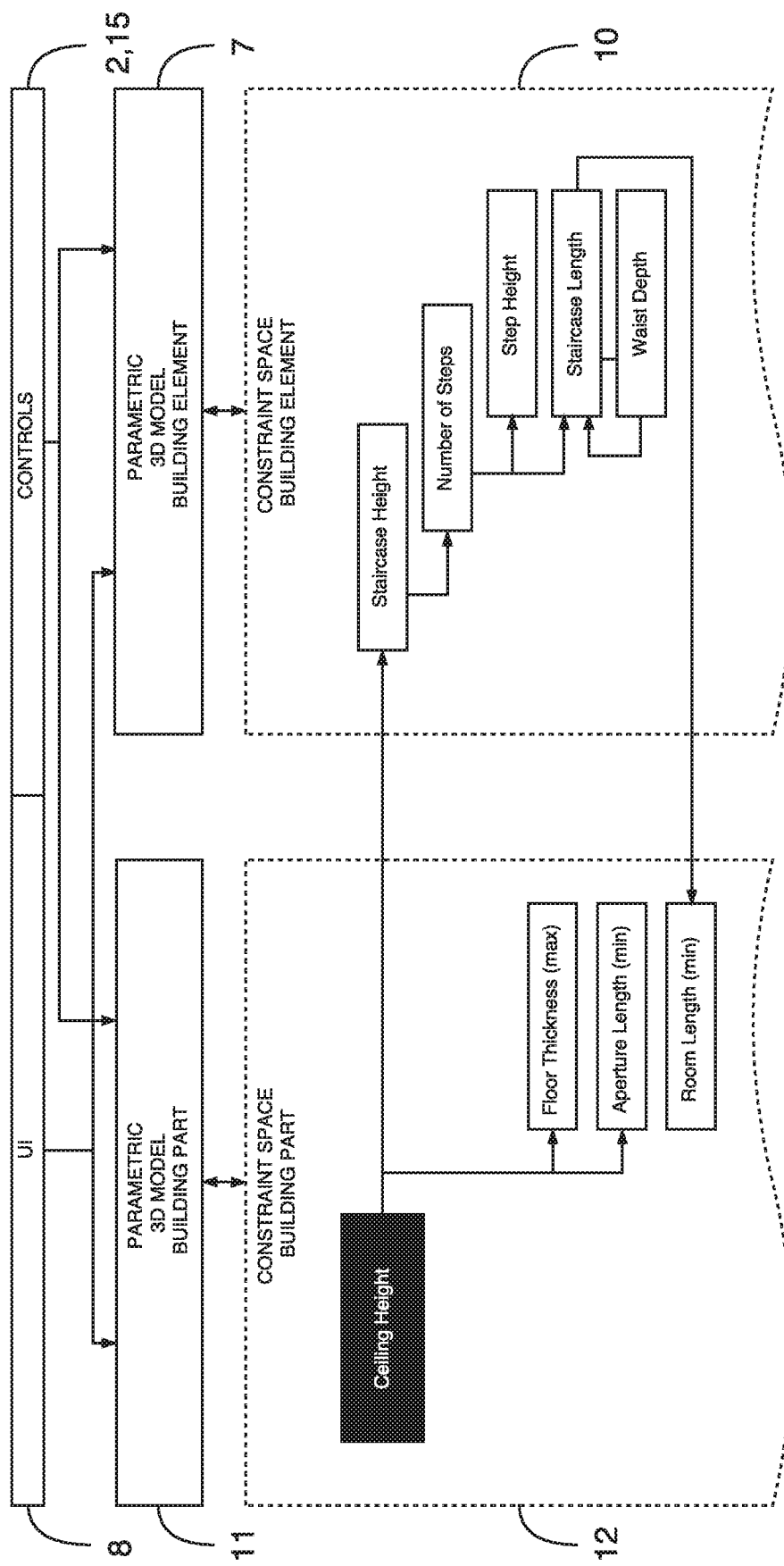

In FIGS. 5 and 6, an example is visualized of a part of a building element constraint space 10, here again for the staircase 1, and a building part constraint space 12, and the interactions between these constraint spaces and the parametric models 7, 11 and with one another. The building part in this example again is the room in which the staircase 1 is to be placed and used.

The parameter "Ceiling Height", for example, can be set by the user, but is also constrained by a set of other parameters. Some of these constraints are defined as minimum or maximum values, and these are here stored and available in the database with constraints. In FIG. 5, it is illustrated how the lower boundary of "Ceiling height" is linked to and defined by a value of the "Minimum height of a space" as set in the database with constraints 13. This value can for instance be prescribed in building regulations. The maximum value for the parameter "Ceiling height" is linked to "ceiling height (max)" which again is linked to the parameter "Floor thickness" and the parameter "span(max)" which is defined in the building element constraint space.

The parameter "Span(max)" in turn is defined by a parameter "Max span of a staircase without intermediate landing" which is defined in the database with constraints 13. The parameter "Span(max)" is further coupled to the parameters "Staircase Height(max)", "Waist Depth(min)" and "Staircase Length(max)" which are all defined in the building element constraint space 10.

The parameter "Staircase Height(max)" in turn is limited by parameter "Maximum slope" as defined in the database with constraints 13, and is linked to the parameter "Staircase Length (max)". In turn, the parameter Staircase Length (max) is defined by a parameter "room Length" which is defined in the building part constraint space 12, by a parameter "Minimum free space at landing" as defined in the database with constraints 13 and as mentioned by the parameter "Staircase Height (max)". This example of one parameter in the building part constraint space 12 already indicates two links between the building element constraint space 10 and the building part constraint space 12. There are, however, many more parameters that define the constraint spaces.

In FIG. 6 it is illustrated how a change in the ceiling height in turn affects other parameters. As illustrated in FIG. 6, the modification of the parameter "Ceiling Height" affects several parameters in the building part constraint space 12:

Staircase Height

Number of steps (via Staircase Height)

Step Height (via Number of steps)

Staircase Length (via Number of steps)

Waist Depth (via Number of steps)

and some in the building element constraint space 10:

Floor Thickness(max)

Aperture Length (min)

Room Length(min)

Thus, both constraint spaces are linked together via parameters and their dependencies.

Some of the parameters have a simple maximum value and a minimum value, that may for instance be defined by or in one of the database constraint classes. Other parameters may have a simple maximum value and/or a minimum value that are defined in the constraint space itself or in a other constraint space. Yet other parameters are defined by, or depend on, one or more other parameters. These relations can be simple linear relations between one or more parameters, but may also be more complex mathematical relationships between parameters. Some of these dependent parameters may be defined in an other constraint space, as is illustrated above. Depending on the building element, these relations are pre-defined together with the parametric 3D model. For similar building element types, for instance staircases, many of these relationships may be identical.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

REFERENCE NUMBERS 1 building element
2 user tool
3 user feedback tool
4 customizer
5 3D production assembly instructions
6 3D production assembly
7 building element parametric 3D model
8 User interface
9 user
10 building element constraint space
11 building part parametric 3D model
12 building part constraint space
13 constraint database
14 constraint classes
15 solver
16 library with building elements and building parts
17 building element selector
18 building part selector
20 building part
21 ceiling
22 floor
23 opening in ceiling
30 building part customization selector
31 building element customization selector

The invention claimed is:

1. A method for forming a building element, comprising defining in a computer memory:
　a building element parametric three-dimensional (3D) model of the building element, and
　a building element constraint space, said building element constraint space comprising building element dimensional parameters of said building element that are mathematically coupled to at least one selected from another dimensional parameter of the building element, a minimum value, a maximum value, and a combination thereof;
providing at least one 3D manufacturing assembly comprising a control system having a data processor for processing control instructions for controlling said 3D manufacturing assembly, said method further comprising running a computer program on a computer system which:
　retrieves from said computer memory said building element parametric 3D model and its linked constraint space;
　visualizes said building element parametric 3D model through a display system;
　provides a user tool which is visualized through said display system and which allows a user to modify one or more building element dimensional parameters to provide an amended building element parametric 3D model by receiving user input via a user input system that is operationally coupled with said computer system, wherein said modification of said building element dimensional parameters by said user tool is limited by said building element constraint space;
　visualizes said amended building element parametric 3D model through said display system in response to said user input, and
　converts said amended building element parametric 3D model into control instructions for said control system for controlling at least one 3D manufacturing assembly for forming said amended building element and provides said control instructions to said control system.

2. The method of claim 1, further comprising:
　defining in said computer memory at least one building part parametric 3D model relating to a building part where said building element is to be used, and
　defining in said computer memory for said building part parametric 3D model a building part constraint space comprising at least one building part dimensional parameter of said building part that is mathematically coupled at least one building element dimensional parameter, and that are mathematically coupled to at least one selected from another building part dimensional parameter, to a minimum value, to a maximum value, and a combination thereof, and
　wherein said computer program further
　　provides said user tool for receiving user input via said user input system that is operationally coupled with said computer system, to allow said user to modify one or more dimensional parameters of said building part parametric 3D model into an amended building part parametric 3D model, wherein said computer program compares modification of said one or more building part dimensional parameter by said user with limitations by said building part constraint space and said building element constraint space;
　　modify said building element dimensional parameters in reaction to said modified building part dimensional parameters to provide an amended building element parametric 3D model, which modification of said building element dimensional parameters is limited by said building element constraint space and said building part constraint space;
　　visualizing said amended building part parametric 3D model together with said building element parametric 3D model through said display system, thus showing said user an amended building element in combination with said amended building part via said display system in response to said user input.

3. The method of claim 2, wherein said method further comprises a constraint database comprising at least one database entry selected from a numerical value, a mathematical relation, and a combination thereof, wherein at least one parameter of said building part constraint space and at least one parameter of said building element constraint space are mathematically coupled to said database entry.

4. The method of claim 2, further comprising:
　defining in a computer memory a series of said building part parametric 3D models of a series of building parts;

defining in a computer memory for each of said building part parametric 3D models one of said building part constraint space;

said computer program further:
presents a selection tool on said display system to allow a user to select a building part from said series of building parts, and retrieve user input via said user input system indicating a selected building part;
retrieves from said computer memory said building part parametric 3D model of said selected building part and its linked constraint space, and
visualizes through said display system said building element parametric 3D model of said selected building element with said building part parametric 3D model of said selected building part.

5. The method of claim 2, wherein said computer program further comprises indicating a nature of said constraint on said display system, when said user tool is limited by at least one selected from said building element constraint space, said building part constraint space, and a combination thereof.

6. The method of claim 2, wherein said user tools comprise visualizing on said display system design suggestions for amending dimensional parameters of said building element for fitting said building element parametric 3D model within said building element constraint space and said building part constraint space.

7. The method of claim 1, further comprising:
defining in a computer memory a series of said building element parametric 3D models of a series of building elements;
defining in a computer memory for each of said building element parametric 3D models one of said building element constraint space;

said computer program further:
presents a selection tool on said display system to allow a user to select a building element from said series of building elements, and retrieve user input via said user input system indicating a selected building element;
retrieves from said computer memory said building element parametric 3D model of said selected building element and its linked constraint space, and
visualizes through said display system said building element parametric 3D model of said selected building element.

8. The method of claim 1, wherein said building element constraint space comprises dimensional parameter requirements selected from legal requirements on said building element, design requirements on said building element, structural requirements of said building element, production requirements, installation requirements, and a combination thereof.

9. The method of claim 1, wherein for gathering data of said building element constraint space, said computer program runs at least one query on at least one remote computer system.

10. The method of claim 1, wherein said at least one 3D manufacturing assembly comprises a 3D printing assembly.

11. The method of claim 1, wherein said forming comprises applying a setting composition, and optionally molding said setting composition.

12. The method of claim 1, further comprising said computer program performing:
transforming a building element constraint into said building element constraint space, wherein said transforming comprises transforming constraint space requirements into spatial dimensional boundaries and spatial dimensional boundary mathematical dependencies relating to said building element.

13. A computer program product for forming a building element, said computer program product when running on a computer system:
retrieves from a computer memory a building element parametric 3D model and its linked building element constraint space;
visualizes said building element through a display system;
provides a user tool which is visualized through said display system and which allows a user to modify one or more building element dimensional parameters to provide an amended building element parametric 3D model by receiving user input via a user input system that is operationally coupled with said computer system, wherein said modification of said building element dimensional parameters by said user tool is limited by said building element constraint space;
visualizes said amended building element parametric 3D model through said display system by showing said user an amended building element via said display system in response to said user input, and
converts said amended building element parametric 3D model into control instructions for controlling at least one 3D manufacturing assembly for forming said amended building element.

14. An assembly for forming a building element, comprising:
at least one 3D manufacturing assembly comprising a control system having a data processor for processing control instructions for controlling said 3D manufacturing assembly;
a computer system comprising a display system, a computer memory storing a building element parametric 3D model and a data processing system comprising a computer program which, when running on said computer system:
retrieves from said computer memory said parametric 3D model of said building element and its linked building element constraint space;
visualizes said building element through a display system;
provides a user tool which is visualized through said display system and which allows a user to modify one or more building element dimensional parameters to provide an amended building element parametric 3D model by receiving user input via a user input system that is operationally coupled with said computer system, wherein said modification of said building element dimensional parameters by said user tool is limited by said building element constraint space;
visualizes said amended building element parametric 3D model through said display system, by showing said user an amended building element via said display system, in response to said user input, and
converts said amended building element parametric 3D model into control instructions for controlling said at least one 3D manufacturing assembly for forming said amended building element and provides said control instructions to said control system.

* * * * *